United States Patent [19]

Hombu et al.

[11] Patent Number: 4,599,685
[45] Date of Patent: Jul. 8, 1986

[54] CONTROL CIRCUIT FOR POWER CONVERTER APPARATUS

[75] Inventors: Mitsuyuki Hombu, Katsuta; Shigeta Ueda, Hitachi; Katsunori Suzuki, Takahagi; Yasuo Matsuda, Hitachi, all of Japan

[73] Assignee: Hitachi, Ltd., Tokyo, Japan

[21] Appl. No.: 694,668

[22] Filed: Jan. 24, 1985

[30] Foreign Application Priority Data

Jan. 25, 1984 [JP] Japan ................... 59-10118

[51] Int. Cl.$^4$ ............................. H02M 1/12
[52] U.S. Cl. ...................... 363/41; 363/37; 363/87; 363/89; 363/127; 363/129
[58] Field of Search ............ 363/37, 41, 85, 87, 363/89, 127, 128, 129

[56] References Cited

U.S. PATENT DOCUMENTS 4,361,866 11/1982 Shima et al. ............... 363/129
4,423,477 12/1983 Gurr ......................... 363/87
4,495,557 1/1985 Weit ......................... 363/89

OTHER PUBLICATIONS

"A Novel PWM Technique for Three Phase Inverter/-Converter", IPEC, pp. 384-395.
"Society on SPCC of IEEE of Japan", SPC-82-65, pp. 79-88.

Primary Examiner—Patrick R. Salce
Assistant Examiner—Anita M. Ault
Attorney, Agent, or Firm—Antonelli, Terry & Wands

[57] ABSTRACT

Disclosed is a control circuit for a power converter apparatus using self-extinction devices as switching devices, in which turn on and turn off operations of the self-extinction devices are controlled by gate pulses which have been subject to pulse width modulation with a pulse train having a pulse width which is sinusoidally varied, and, at the same time, the self-extinction devices in same phase are made conductive in a predetermined period corresponding to an output voltage reference value to make an output of the power converter apparatus be in a shorted state in the sense of DC current to thereby control the output of the power converter apparatus.

7 Claims, 11 Drawing Figures

CONTROL CIRCUIT FOR POWER CONVERTER APPARATUS

The present invention generally relates to a power converter apparatus and more particularly to a control circuit for pulse width modulation controlling a power converter apparatus in which self-extinction devices are utilized.

Recently, a power converter apparatus utilizing pulse width modulation (hereinafter referred to as PWM) has been widely used in this field. For example, in an AC-to-DC converter, a current conduction angle of a controlled switching device is controlled by a gating pulse which has been subject to PWM so as to obtain a desired DC output. The gating pulse is formed by a control circuit section different from a main circuit. The basic function of the gating pulse is such that a carrier wave is compared with a reference waveform signal or a modulation signal so as to obtain a PWM pulse corresponding to the instantaneous level of the both signals. Generally, a triangle wave is used as a carrier signal and a sinusoidal wave is used as a reference waveform signal. In the conventional power converter apparatus, however, harmonic components are considerably contained in an AC current which is switching-controlled by switching devices and which flows into the power converter apparatus so that such harmonic components may cause wrong operations in another apparatus, for example, such as a breaker, which utilizes an AC source in common with the power converter apparatus, or may act as an noise signal to a communication equipment, or the like.

Although there is a method of providing a filter in order to reduce the harmonic components of this kind, it is required to provide a large capacity filter corresponding to the capacity of a power converter apparatus in order to sufficiently remove the harmonic components, resulting in increase in size of the whole arrangement of the power converter apparatus to make the apparatus disadvantageous in an economical view point.

An object of the present invention is therefore to provide a control circuit for a power converter apparatus, in which it is possible to reduce harmonic components without increasing in size of the whole arrangement of the apparatus and without making the circuit complicated in comparison with the conventional apparatus.

In order to eliminate the disadvantage of the conventional apparatus as described above, in the control circuit according to the present invention, turning on and turning off operations of self-extincition devices of the power converter apparatus are controlled by using a pulse train synchronized with an AC source and having pulse widths which are sinusoidally varied. At the same time a pair of serially connected self-extinction devices are simultaneously turned on by a pulse train having pulse widths corresponding to an output voltage reference value. This pulse train makes the power converter shoot-through condition so as to control the mean value of the output voltage to sinusoidally vary the pulse width of input currents to the power converter apparatus to thereby reduce the harmonic components contained in the PWM controlled current.

The present invention will be apparent from the following detailed description taken in conjunction with the accompanying drawings, in which:

Figure 1:
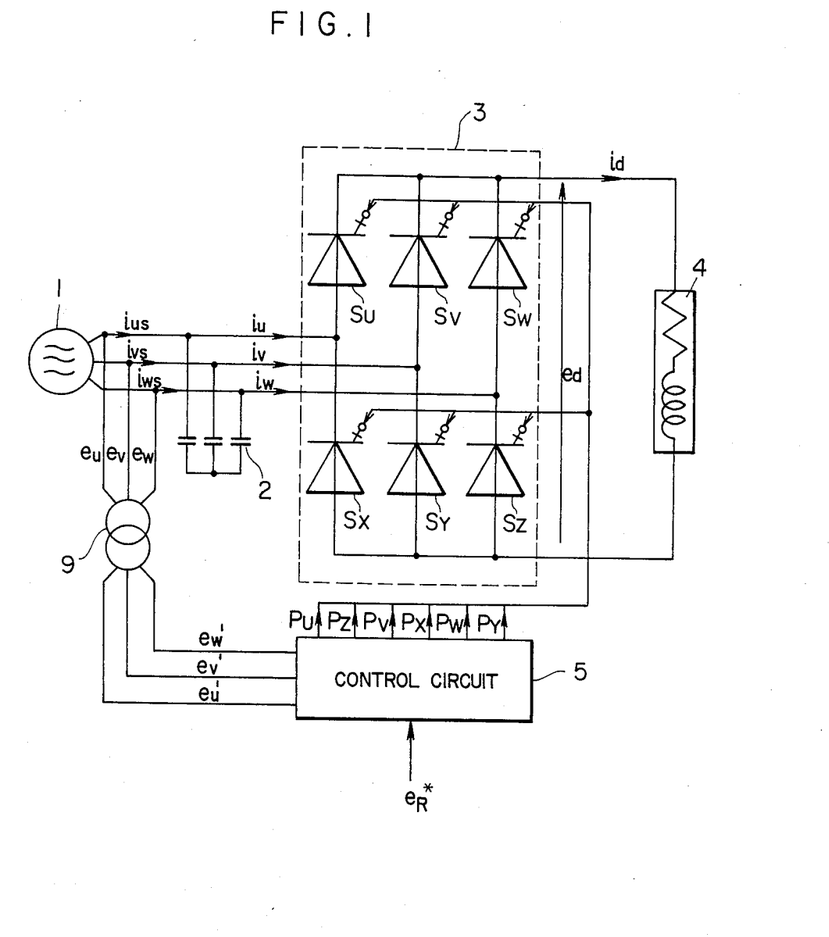
FIG. 1 is a schematic diagram showing the whole arrangement of the power converter apparatus in which self-extinction devices in the form of bridge connection are used.

FIG. 1 shows an AC-DC converter as a power converter apparatus in which gate turn-off thyristors (hereinafter referred to as GTOs) $S_U$, $S_V$, $S_W$, $S_X$, $S_Y$ and $S_Z$ are used as self-extinction devices connected in the form of a bridge arrangement. In FIG. 1, there are provided a three-phase AC source 1, an input side capacitor 2, a converter main circuit 3, a load 4, a GTO control circuit 5, and a transformer 9. Gate pulses $P_U$–$P_Y$ from the GTO control circuit 5 are respectively applied to the gates of the GTOs at a predetermined timing so as to turn on or turn off the GTOs to thereby control the DC output voltage $e_d$.

Figure 2:
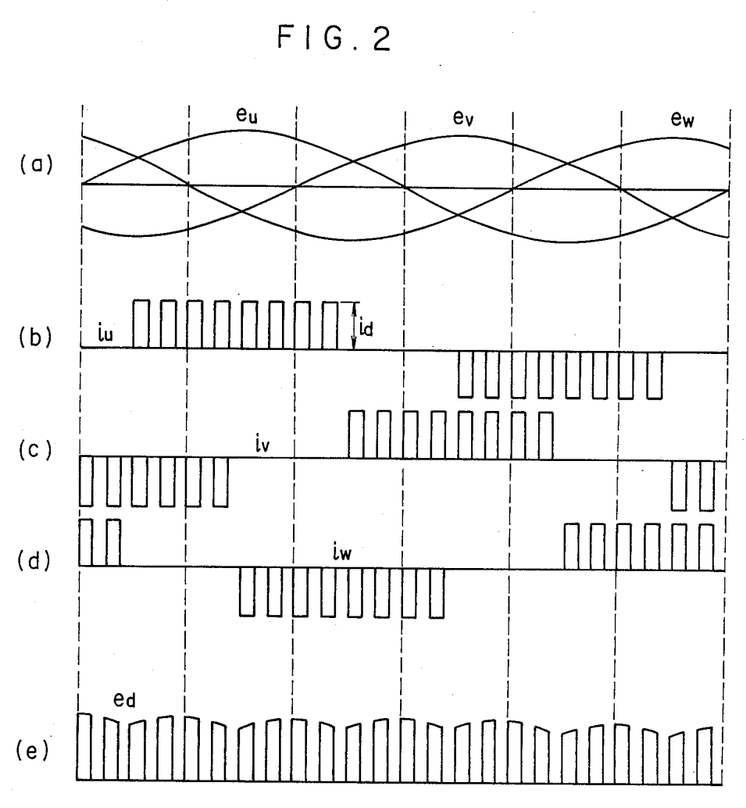
FIG. 2 is a waveform diagram explaining operation of the conventional converter apparatus.

FIG. 2 shows waveforms caused by the gate pulses by the conventional control circuit. In FIG. 2, the symbols $e_u$ to $e_w$ represent the respective phase voltages of the three-phase AC source and $i_u$ to $i_w$ represent the pulse waveforms of the PWM controlled current fed to the converter main circuit 3 controlled by the GTOs.

Conventionally, since the turning on and turning off operations of the GTOs $S_U$, $S_V$, $S_W$, $S_X$, $S_Y$ and $S_Z$ has been controlled by a pulse signal of the same pulse width in accordance with a target DC-output voltage $e_R{}^*$, the respective pulse widths of the PWM controlled currents $i_u$ to $i_w$ fed to the converter main circuit 3 are as shown in (b) to (d) of FIG. 2, while the output DC voltage $e_d$ of the converter is as shown in (e) of FIG. 2. In the manner as described above, since each of the waveforms of the PWM controlled currents $i_u$ to $i_w$ has an pulse train with the same pulse width, harmonic components may be considerably included in each of the currents. Therefore, input currents $i_{us}$ to $i_{ws}$ fed from the AC source 1 also include many harmonic components which can not sufficiently be absorbed even by the input side capacitors 2.

In order to reduce harmonic components due to the pulse train of the same pulse width, a method using a pulse train of the different pulse width is proposed by Tokuo Oynishi and Hiroshi Okitsu, entitled "A Novel PWM Technique for Three-Phase Inverter/Converter" in papers of Society on SPCC of IEE of Japan, SPC-82-65. In this method, each self-extinction device is controlled by gate pulses with a pulse width which is sinusoidally varied. However, since the variation in pulse width of the PWM controlled current of each phase partially deviates from sinusoidal variation, harmonic components may remain in the current.

Next, the state in which the pulse width of the input current of the converter is sinusoidally varied will be described hereunder by illustrating the control circuit 5 according to the present invention.

Figure 3:
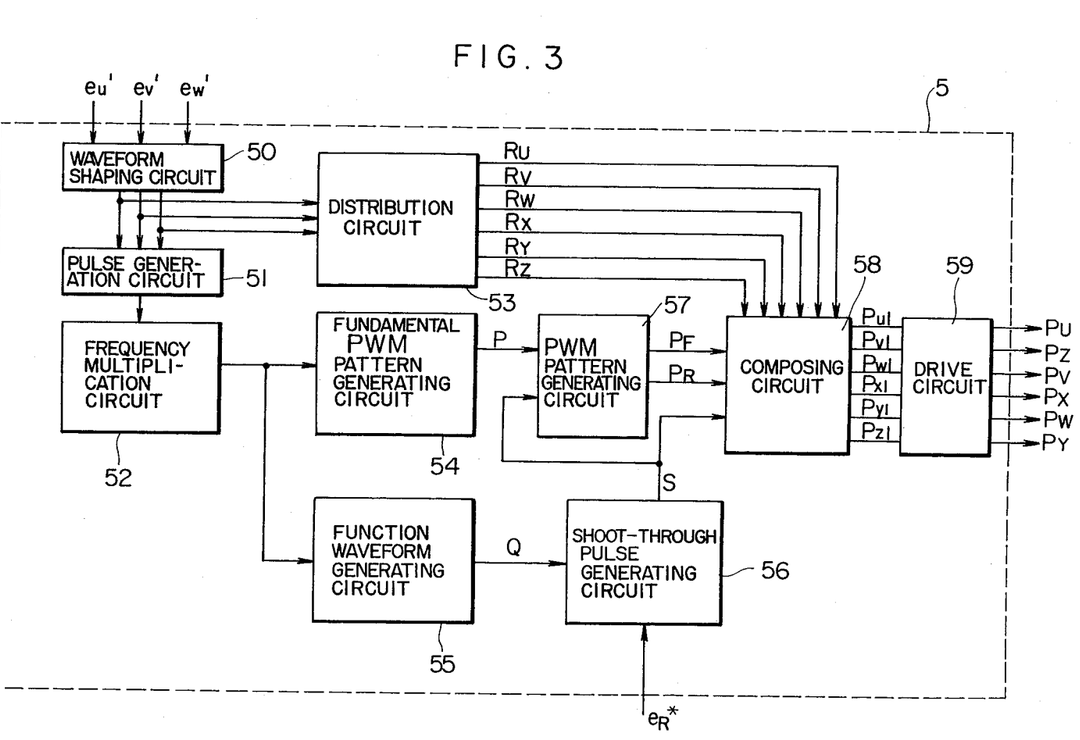
FIG. 3 is a block diagram showing the control circuit for the converter apparatus according to the present invention.

In the embodiment according to the present invention as shown in FIG. 3, a control circuit 5 is constituted by a waveform shaping circuit 50, a pulse generating circuit 51, a frequency multiplication circuit 52, a distribution circuit 53, a fundamental PWM pattern generating circuit 54, a function waveform generating circuit 55, a shoot-through pulse generating circuit 56, a PWM pattern generating circuit 57, a composing circuit 58, and a drive circuit 59.

Figure 5:
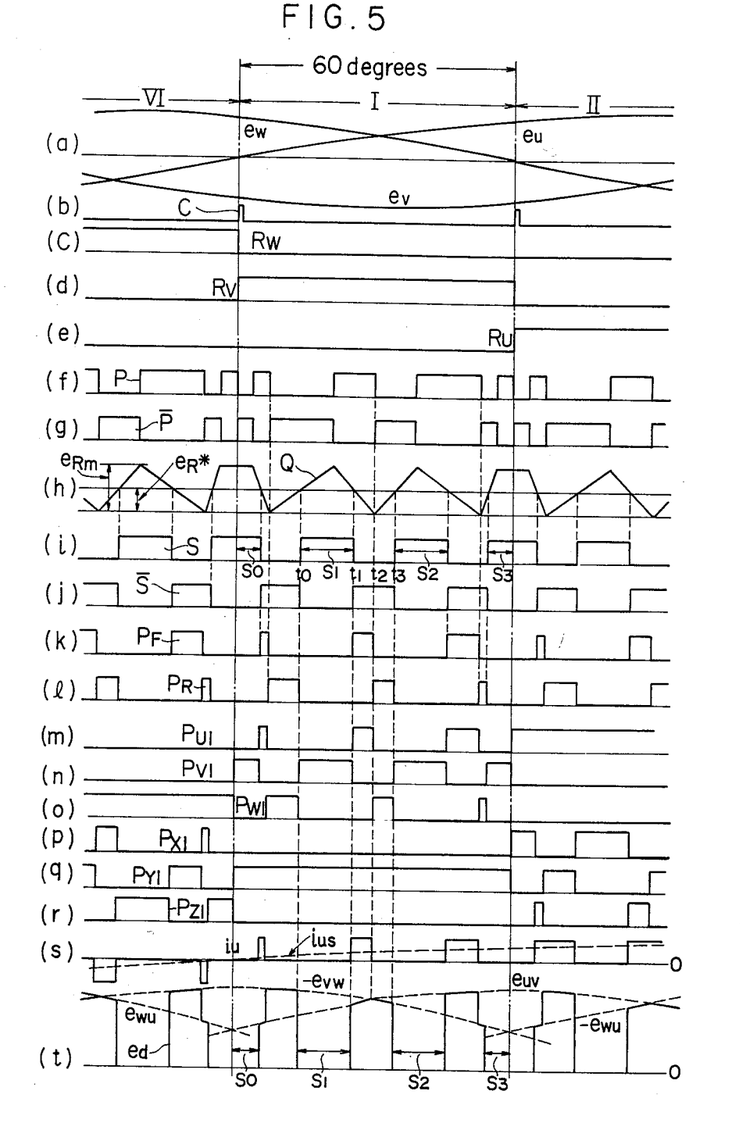
FIGS. 5 and 6 are waveform diagrams for explaining the operation of the circuit shown in FIG. 3.

In the waveform shaping circuit 50, each of waveforms of signals $e_u'$, $e_v'$, and $e_w'$ obtained from source voltages $e_u$, $e_v$ and $e_w$ as shown in FIG. 5 (a) through a transformer 9 (FIG. 1) is shaped so as to obtain a rectangular wave pulse.

The output signal of the waveform shaping circuit 50 is applied to the pulse generating circuit 51. For example, as shown in FIG. 5 (b), a pulse signal C synchronized with the source waveforms in every 60 degrees is obtained such that a zero-crossing is detected for each phase and such a pulse signal C is produced at that time of detection.

In the frequency multiplication circuit 52, the frequency of the pulse signal C is multiplied to a predetermined multiple so as to form a clock pulse signal.

In the distribution circuit 53, distribution signals $R_U$, $R_V$, $R_W$, $R_X$, $R_Y$ and $R_Z$ necessary to form the gate signals of the self-extinction devices of the converter 3 are obtained in accordance with the output signal of the waveform shaping circuit 50. The distribution signals are shown in (c) to (e) of FIG. 5. In the distribution circuit 53, high-level signals of six-phases are alternately produced during a phase angle of 60 degrees in accordance with pulses spaced with of each 60 degrees. The circuit 53 may be constituted by wellknown logic circuits, such as a combination of counters and decoders. The fundamental PWM pattern generating circuit 54 produces a reference pattern P composed of a pulse train of a pulse width which sinusoidally varies as shown in FIG. 5 (f) in each 60 degrees. The fundamental PWM pattern generating circuit 54 is constituted by a memory, such as a read only memory (hereinafter referred to as a ROM), or the like, and arranged such that a predetermined pulse pattern is stored in the memory and the contents of the ROM is read out synchronously with an output signal of the frequency multiplication circuit 52.

The function waveform generating circuit 55 generates a function waveform, such as a triangle wave Q as shown in FIG. 5 (h), synchronized with the rising and falling of the reference pattern P of the reference pattern generating circuit 54. The function waveform generating circuit 55 may be constituted by a memory similarly to the reference pattern generating circuit 54. The fundamental PWM pattern generating circuit 54 and the function waveform generating circuit 55 are read out according to the output signal of the frequency multiplication circuit 52, thereby to synchronize the output signals P and Q of the circuits 54 and 55.

The shoot-through pulse generating circuit 56 compares the voltage reference value $e_R^*$ with the amplitude of the output signal Q of the function waveform generating circuit 55 as shown in FIG. 5 (h), and generates a shoot-through pulse S for making the converter main circuit 3 in DC-short condition as shown in FIG. 5 (i). At this time, in the case where the voltage reference value $e_R^*$ is in the form of digital quantity, the function waveform generating circuit 55 may produce the contents of the memory in the function waveform generating circuit as it is, while in the case it is in the form of analog quantity, it is necessary to provide a digital-analog (D/A) converter connected to the output side of the memory.

The PWM pattern generating circuit 57 forms switching patterns $P_F$ and $P_R$ (FIG. 5 (k), (l)) of a pulse width modulation signal in a 60-degree period in an operation period of the AC source 1 (FIG. 1), on the basis of the output signal P of the fundamental PWM pattern generating circuit 54 and the output signal S of the shoot-through pulse generating circuit 56.

The composing circuit 58 forms turn on and turn off signals $P_{U1}$, $P_{V1}$, $P_{W1}$, $P_{X1}$, $P_{Y1}$ and $P_{Z1}$ for the GTOs of the converter main circuit 3 on the basis of the respective output signals $R_U$, $R_V$, $R_W$, $R_X$, $R_Y$, $R_Z$, $P_F$, $P_R$ and S of the distribution circuit 53, the shoot-through pulse generating circuit 56, and the PWM pattern generating circuit 57. The turn-on and turn-off signals $P_{U1}$, $P_{V1}$, $P_{W1}$, $P_{X1}$, $P_{Y1}$ and $P_{Z1}$ are made in the drive circuit 59 into signal level which is sufficient to turn on and turn off the GTOs, and supplied to the GTO gates. An example of a particular arrangement of the circuit 58 is shown in FIG. 4, and the respective output signals $P_{U1}$, $P_{V1}$, $P_{W1}$, $P_{X1}$, $P_{Y1}$ and $P_{Z1}$ are shown in (m) to (r) of FIG. 5.

Now, referring to FIG. 5, the operation of the embodiment will be described hereunder.

FIG. 5 shows corresponding signal waveforms (b) to (t) in a 60-degree period of the AC source 1 and the operation in this period is repeated throughout the entire operation period.

Figure 4:
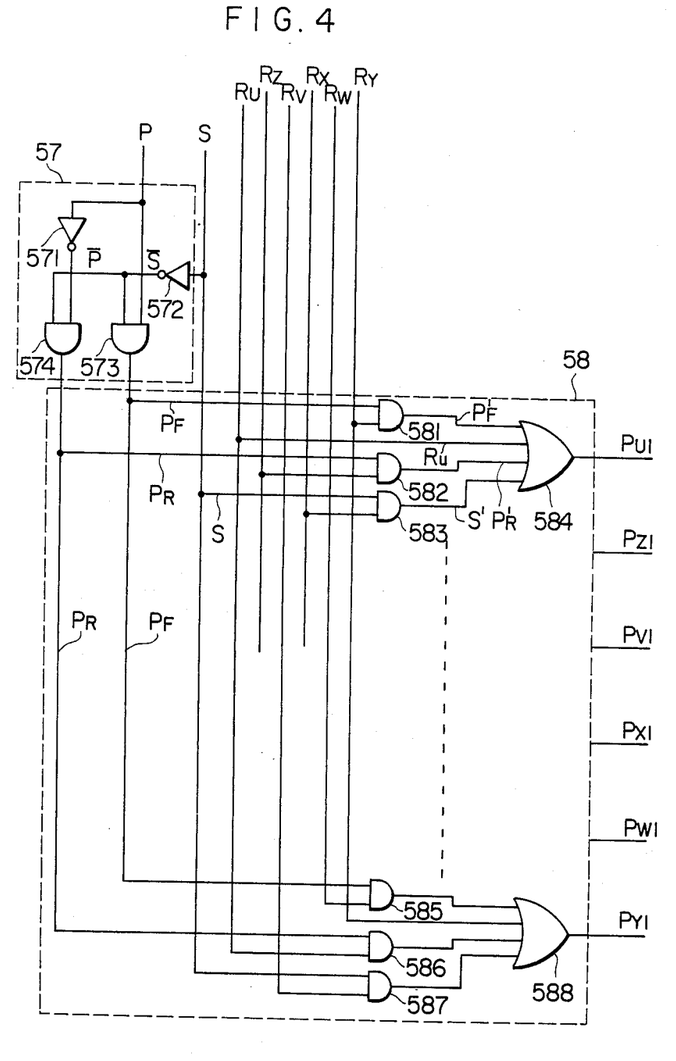
FIG. 4 is a main part circuit diagram showing a main part of the circuit shown in FIG. 3.

Referring to FIG. 4, the operations in the PWM pattern generating circuit 57 and the composing circuit 58 will be described hereunder.

As shown in FIG. 4, the PWM pattern generating circuit 57 is provided with inverters 571 and 572 which produce inverted signals $\overline{P}$ and $\overline{S}$ of the pattern signal P and the shoot-through pulse S respectively as shown in (g) and (j) of FIG. 5. The pairs of signals P and $\overline{S}$; $\overline{P}$ and S are respectively applied to AND circuits 573 and 574, so that signals $P_F$ and $P_R$ are produced respectively from the AND circuits 573 and 574 as shown in (k) and (l) of FIG. 5.

Thus, the composing circuit 58 forms the gate pulses $P_{U1}$, $P_{V1}$, $P_{W1}$, $P_{X1}$, $P_{Y1}$ and $P_{Z1}$ to be supplied to the converter main circuit 3 (FIG. 1) on the basis of the obtained signals S, $P_F$ and $P_R$, and the output signals $R_U$, $R_V$, $R_W$, $R_X$, $R_Y$ and $R_Z$ of the distribution circuit 53. This state will be described, by way of example, as to the case where the gate pulse $P_{U1}$ for the element $S_U$ (FIG. 1) is formed. The gate pulses other than $P_{U1}$ are formed in the same manner as that will be described in the following.

Each of AND circuits 581, 582, 583, 585, 586 and 587 of the composing circuit 58 performs AND operation (making logical products) between one of the output signals of the distribution circuit 53 and one of the output signals of the PWM pattern generating circuit 57 and the shoot-through pulse generating circuit 56.

The output signals of the AND circuit 581–583 and 585–587 are applied to two OR circuits 584 and 588 respectively. At this time, the output signal $R_U$ of the distribution circuit 53 is also applied to the OR circuit 584, so that the gate pulse $P_{U1}$ is formed. On the basis of those signals supplied thereto.

Accordingly, in the period I in FIG. 5, the distribution signal $R_V$ of the distribution circuit 53 is logic "1" and other signals $R_U$ and $R_W$ are logic "0" as shown in (c) to (e) of FIG. 5, so that the output signal $P_F'$ of the AND circuit 581 becomes identical with the output signal $P_F$ of the PWM pattern generating circuit 57, while the output signals of the other AND circuits 582 and 583 become logic "0".

Further, at this time, since the distribution signal $R_U$ is logic "0", the output gate pulse $P_{U1}$ of the OR circuit 584 becomes identical with the output signal $P_F$ of the PWM pattern generating circuit 57.

In the period II in FIG. 5, only the distribution signal $R_U$ is logic "1", and the output gate pulse $P_{U1}$ of the OR circuit 584 is identical with the distribution signal $R_U$ similarly to the case as described above.

In the period VI in FIG. 5, only the distribution signal $R_W$ is logic "1", and all the input signals to the OR gate 584 are logic "0", so that at this time, the output gate pulse $P_{U1}$ of the OR circuit 584 is logic "0".

Thus, the gating pulse $P_{U1}$ for the GTO $S_U$ is as shown in FIG. 5 (m).

The gating pulses $P_{V1}$, $P_{W1}$, $P_{X1}$, $P_{Y1}$ and $P_{Z1}$ for the GTOs $S_V$, $S_W$, $S_X$, $S_Y$ and $S_Z$ are formed by the composing circuit 58 in the same manner as described above and are as shown in (n) to (r) of FIG. 5.

As described above, the gating pulses $P_U$–$P_Y$ which are formed by the control circuit 5 are applied to the GTOs of the converter main circuit 3, so that the converter is operated as described in the following.

For example, consideration is made as to the operation in period $t_0$–$t_3$ as shown in FIG. 5 (i). In the period $t_0 \leq t < t_1$ as to time t, the shoot-through pulse S exists and the gate pulse $P_{V1}$ and $P_{Y1}$ are supplied to the series connected GTOs $S_V$ and $S_Y$ in the converter main circuit 3 to make these GTOs turned on at the same time. Since each of the GTOs $S_V$ and $S_Y$ is in its on-state, the converter main circuit 3 is in its DC-shorted state so that the DC output voltage $e_d$ becomes zero as shown in FIG. 5 (t).

In the period $t_1 \leq t < t_2$, the shoot-through pulse does not exist and the gate pulse $P_{U1}$ and $P_{Y1}$ are supplied to the GTOs $S_U$ and $S_Y$ of the converter main circuit 3 so that each of these GTOs $S_U$ and $S_Y$ turned on, and the DC output voltage $e_d$ becomes equal to the line voltage $e_{uv}$ of the AC source 1 as shown in FIG. 5 (t).

At the time $t = t_2$, the GTO $S_U$ is turned off and the GTO $S_W$ is turned on by the gate pulses $P_{U1}$ and $P_{W1}$, so that the current is commutated from the U-phase to the W-phase.

In the period $t_2 \leq t < t_3$, each of the GTOs $S_W$ and $S_Y$ is turned on by the gate pulse $P_{W1}$ and $P_{Y1}$ and the DC output voltage $e_d$ of the converter 3 becomes equal to the line voltage $e_{wv}$ ($= -e_{vw}$) between the W- and V-phase of the AC source 1 as shown in FIG. 5 (t).

In the period $t \geq t_3$, the shoot-through pulse S exists again and each of the GTOs $S_V$ and $S_Y$ is turned on, so that the DC output becomes zero in the same manner as the above-mentioned period $t_0 \leq t < t_1$.

Thereafter, the same operation is repeated. That is, the output side of the converter main circuit 3 is compulsorily shorted in the period where the shoot-through pulse S exists, so that the PWM controlled current to the main circuit 3 becomes zero in each of the three phases. Accordingly, the PWM controlled current to the main circuit 3 becomes a pulse train which becomes zero in each period in which the shoot-through pulse S exists, as shown with the U-phase current $i_u$ in FIG. 5 (S).

In the case where the DC output voltage reference value $e_R^*$ to be applied to the shoot-through pulse generating circuit 56 is varied, the operation is as follows.

First, when the reference value $e_R^*$ is made smaller, the pulse width of the shoot-through pulse S becomes wider as apparent from (h) and (i) of FIG. 5. When the pulse width becomes wider, the period in which the DC output voltage $e_d$ of the converter main circuit 3 is zero is prolonged to thereby make the mean value of the output voltage $e_d$ smaller, because the DC output voltage $e_d$ of the converter main circuit 3 is zero in the period in which the shoot-through pulse S exists as described above.

When the reference value $e_R^*$ is made larger, on the contrary, the pulse width of the shoot-through pulse S becomes narrower conversely to the case described above. Consequently, the mean value of the DC output voltage $e_d$ becomes larger on the contrary to the above case.

As seen from the above description, the mean value of the DC output voltage $e_d$ can be varied corresponding to the reference value $e_R^*$.

Figure 6:
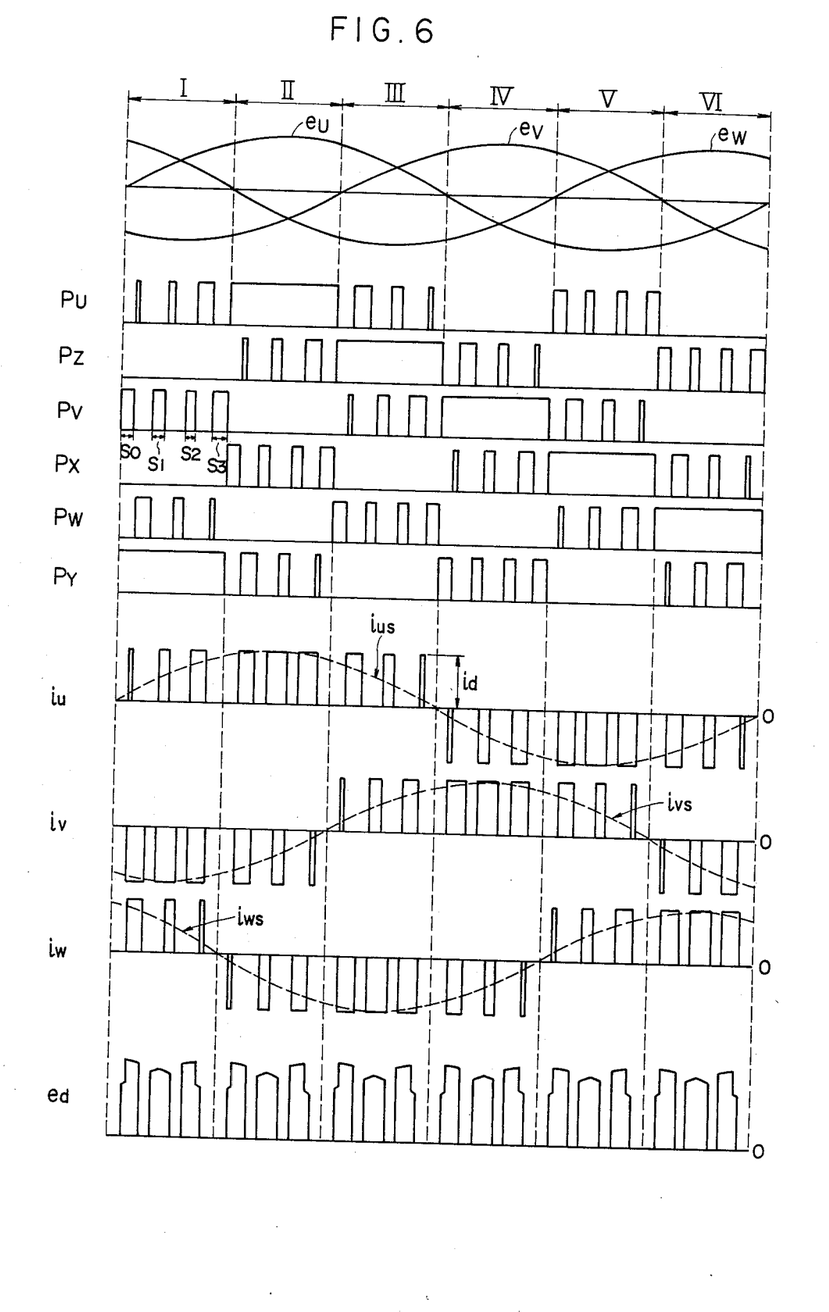

FIG. 6 shows the relation among the respective phase voltages of the power source 1 and the gate pulses, the input currents to the main circuit 3, and the output voltage therefrom. That is, there are shown the respective waveforms of the gate pulses $P_U$, $P_V$, $P_W$, $P_X$, $P_Y$ and $P_Z$, the PWM controlled currents $i_u$, $i_v$ and $i_w$, and the output voltage $e_d$ in one cycle of the source frequency.

As apparent from the drawing, each of the pulse widths of the PWM controlled currents $i_u$–$i_w$ is sinusoidally varied so that harmonic components are extremely decreased in comparison with the current of the same pulse width according to the conventional system. Therefore, the respective waveforms of the AC current $i_{us}$, $i_{vs}$ and $i_{ws}$ are made substantially sinusoidal by means of the filtering effect of the capacitor 2 at the input side of the converter 3, as shown in FIG. 6.

Figure 7:
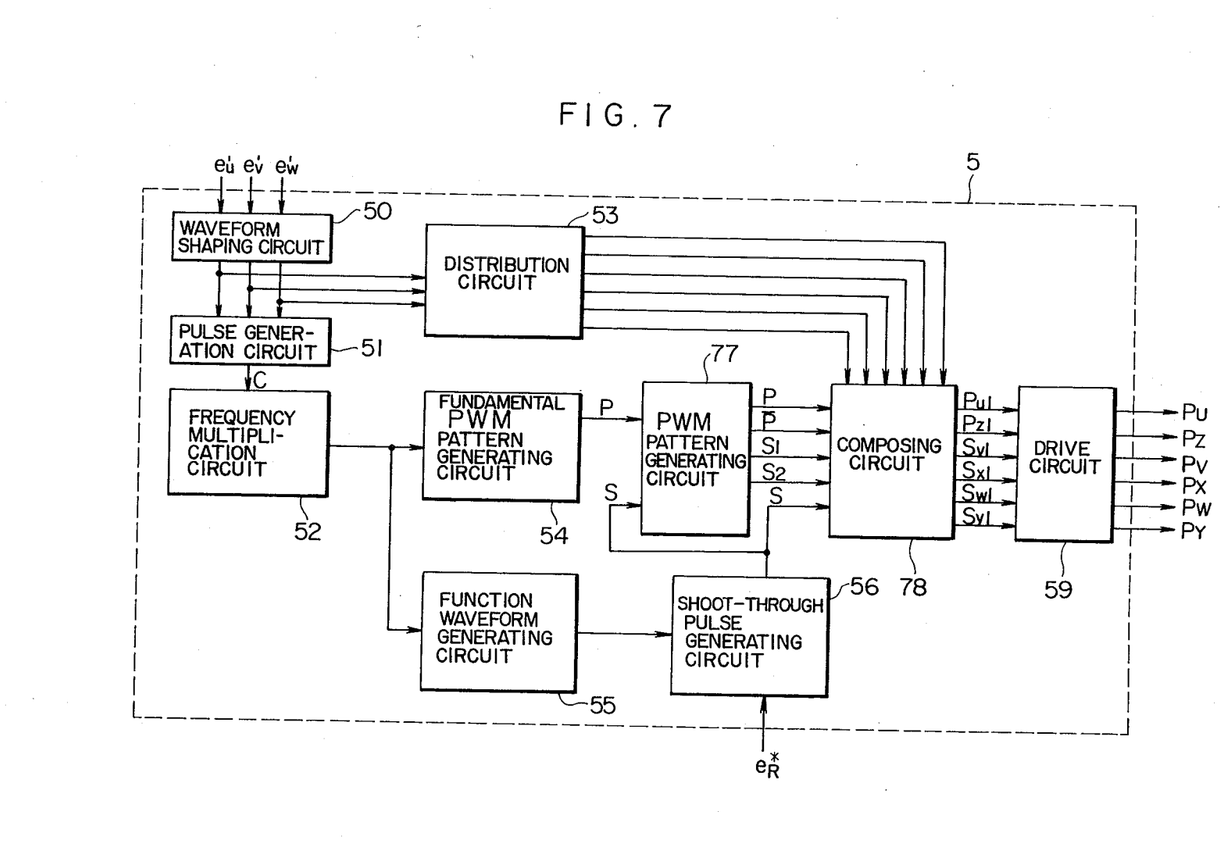
FIG. 7 is a block diagram showing another control circuit for the converter apparatus according to the present invention.

FIG. 7 shows another embodiment according to the present invention, in which the arrangement of each of a PWM pattern generating circuit 77 and a composing circuit 78 is different from that in the embodiment of FIG. 3. The detail of the circuits 77 and 78 are shown in FIG. 8.

In the embodiment of FIG. 3, as apparent from FIGS. 5 and 6, the control for adding the shoot-through S to the gate pulse $P_{X1}$ of the GTO $S_X$ connected in series to the GTO $S_U$ is performed in a 60-degree period where PWM control with the reference pattern is not performed, for example, such as the period II in the case of the gate pulse $P_{U1}$ of the GTO $S_U$ (FIG. 5 (m)).

Figure 8:
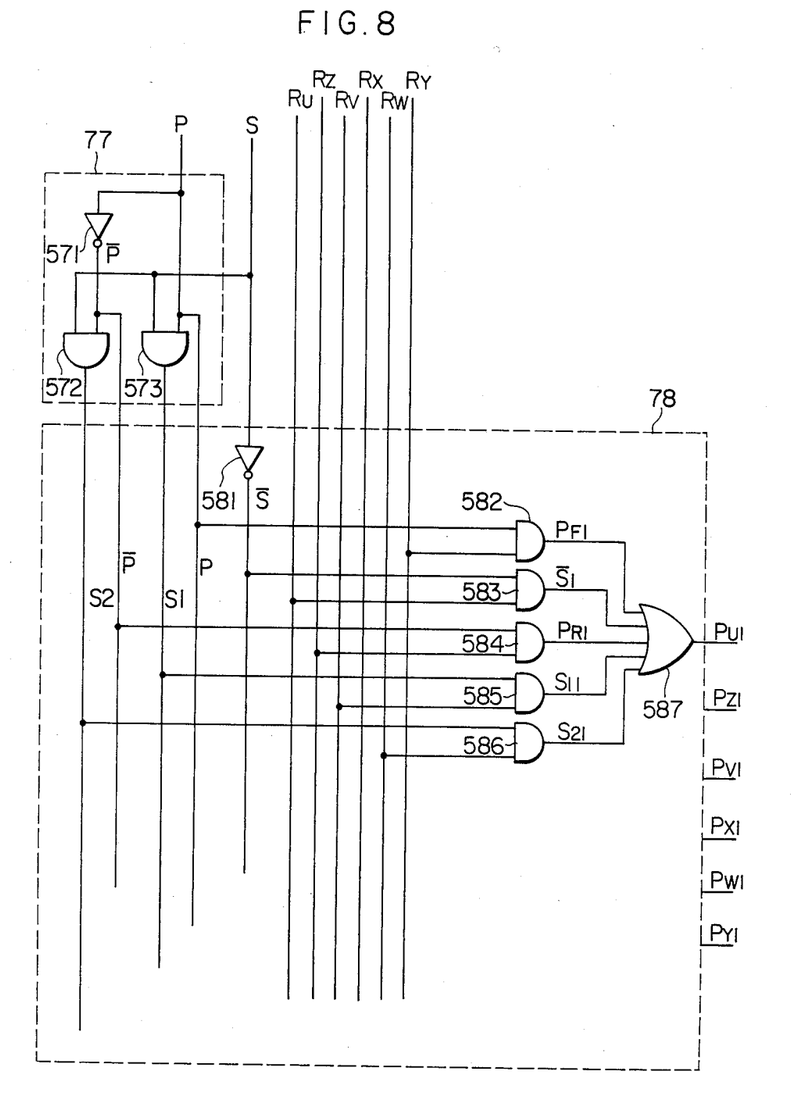
FIG. 8 is a circuit diagram showing a main part of the circuit shown in FIG. 7.

On the contrary, in the other embodiment of FIGS. 7 and 8, the control for adding the shoot-through pulse S to the gate pulses $P_{U1}$ is performed in a 60-degree period at each of the both sides of the above-mentioned 60-degree period, for example, such as the periods I and III in the case of the gate pulse $P_{U1}$.

The arrangement of the circuits other than a PWM pattern generating circuit 77 and a composing circuit 78 is not different from those of the embodiment of FIG. 3, and the explanation as to those circuits is omitted.

The PWM pattern generating circuit 77 is provided with an inverter 571 which forms an inverted signal $\bar{P}$ of the fundamental PWM pattern signal P. An AND circuit 573 forms a signal $S_1$ by ANDing (logical product) the shoot-through pulse S and the fundamental PWM pattern signal P supplied thereto. An AND circuit 572 forms a signal $S_2$ by ANDing the inverted signal $\overline{P}$ of the fundamental PWM pattern signal P and the shoot-through pulse S supplied thereto.

The composing circuit 78 is provided with an inverter 581 which forms the inverted signal $\overline{S}$ of the shoot-through pulse S. The signals P, $\overline{P}$, $\overline{S}$, $S_1$ and $S_2$ and the output signals $R_U$, $R_V$, $R_W$, $R_X$, $R_Y$ and $R_Z$ are applied in suitable combination to AND circuits 582–586, and the respective output signals of the AND circuit 582–586 are applied to an OR circuit 587. The output of the OR circuit 587 forms the gate pulse $P_{U1}$ for the GTO $S_U$. Other gate pulses $P_{V1}$, $P_{W1}$, $P_{X1}$, $P_{Y1}$ and $P_{Z1}$ are formed in the same manner as the pulse $P_{U1}$.

Now, referring to FIG. 9, the operation of the embodiment will be described hereunder.

Figure 9:
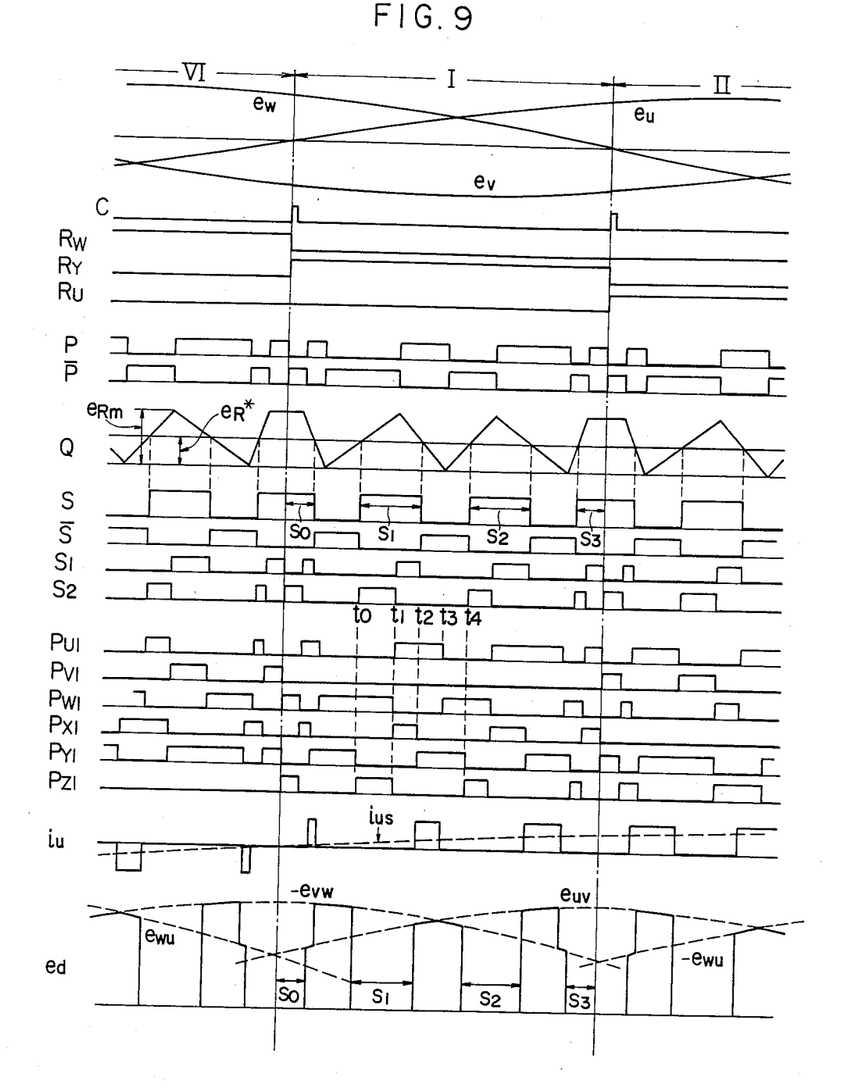
FIGS. 9 and 10 are waveform diagrams for explaining the operation of the circuit shown in FIG. 7.

Similarly to the case of FIG. 5, FIG. 9 shows the status in the 60-degree period I and both the sides thereof in the operation cycle of the power source 1. The operations of the circuits other than the PWM pattern generating circuit 77 and the composing circuit 78 are the same as those in the embodiment of FIG. 3 and the explanation thereof is therefore omitted here.

First, attention is put onto the period I in FIG. 9.

In the period I, only the distribution signal $R_Y$ is logic "1" and other distribution signals $B_W$ and $R_V$ are logic "0". Therefore, the fundamental PWM pattern signal P is chosen and the output gate signal $P_{U1}$ of the OR circuit 587 is as shown in FIG. 9.

In the period II, only the distribution signal $R_U$ is logic "1", so that the inverted signal $\overline{S}$ of the shoot-through pulse S is chosen as the output gate-pulse $P_{U1}$ of the OR circuit 587.

In the period VI, the output signal $S_2$ of the PWM pattern generating circuit 77 is chosen.

Thus, the gate pulse $P_{U1}$ for the GTO $S_U$ is formed and the gate pulses $P_{V1}$, $P_{W1}$, $P_{X1}$, $P_{Y1}$ and $P_{Z1}$ for other GTOs $S_V$, $S_W$, $S_X$, $S_Y$ and $S_Z$ are also formed in the same manner as the gate pulse $P_{V1}$ as shown in FIG. 9.

The converter main circuit 3 (FIG. 1) is controlled by the gate pulse $P_{U1}$, $P_{V1}$, $P_{W1}$, $P_{X1}$, $P_{Y1}$ and $P_{Z1}$ in such a manner as follows.

As to the operation in the period from $t_0$ to $t_4$, in the period $t_0 \leq t < t_1$, the gate pulse $P_{W1}$ and $P_{Z1}$ are applied to the GTOs $S_W$ and $S_Z$ respectively so that the GTOs $S_W$ and $S_Z$ are in their on-state. Accordingly, the main circuit 3 becomes in the DC-shorted state.

In the period $t_1 \leq t < t_2$, the GTOs $S_U$ and $S_X$ are in their on-state so that the DC output side is in the shorted state. That is, in the period $t_0 \leq t < t_2$, the shoot-through pulse S exists and the main circuit is DC-shorted, so that the DC output voltage $e_d$ of the converter becomes zero.

In the period $t_2 \leq t < t_3$, the GTOs $S_U$ and $S_Y$ are in their on-state and the DC output voltage $e_d$ becomes equal to the line voltage $e_{uv}$ between the U-phase and the V-phase of the AC source 1.

In the period $t_3 \leq t < t_4$, the GTOs $S_W$ and $S_Y$ are in their on-state and the DC output voltage $e_d$ becomes equal to the line voltage $e_{wv}$ ($= -e_{vw}$) between the W-phase and the V-phase of the AC source 1.

In the period $t \geq t_4$, the shoot-through pulse S exists again and the operation is the same as that in the period $t_0 \leq t < t_1$ and therefore the DC output voltage $e_d$ becomes zero.

Thereafter, the operation as described above is repeated. Being made zero when the shoot-through pulse S exists, the PWM controlled current flowing in the main circuit 3 is as shown in ($i_u$) of FIG. 9. The waveforms of the current $i_u$ and DC output voltage $e_d$ are quite the same as that in the circuit of FIG. 5.

Further, the mean value of the output voltage $e_d$ can be varied by varying the reference value $e_R^*$ in the same manner as the embodiments of FIG. 3.

Figure 10:
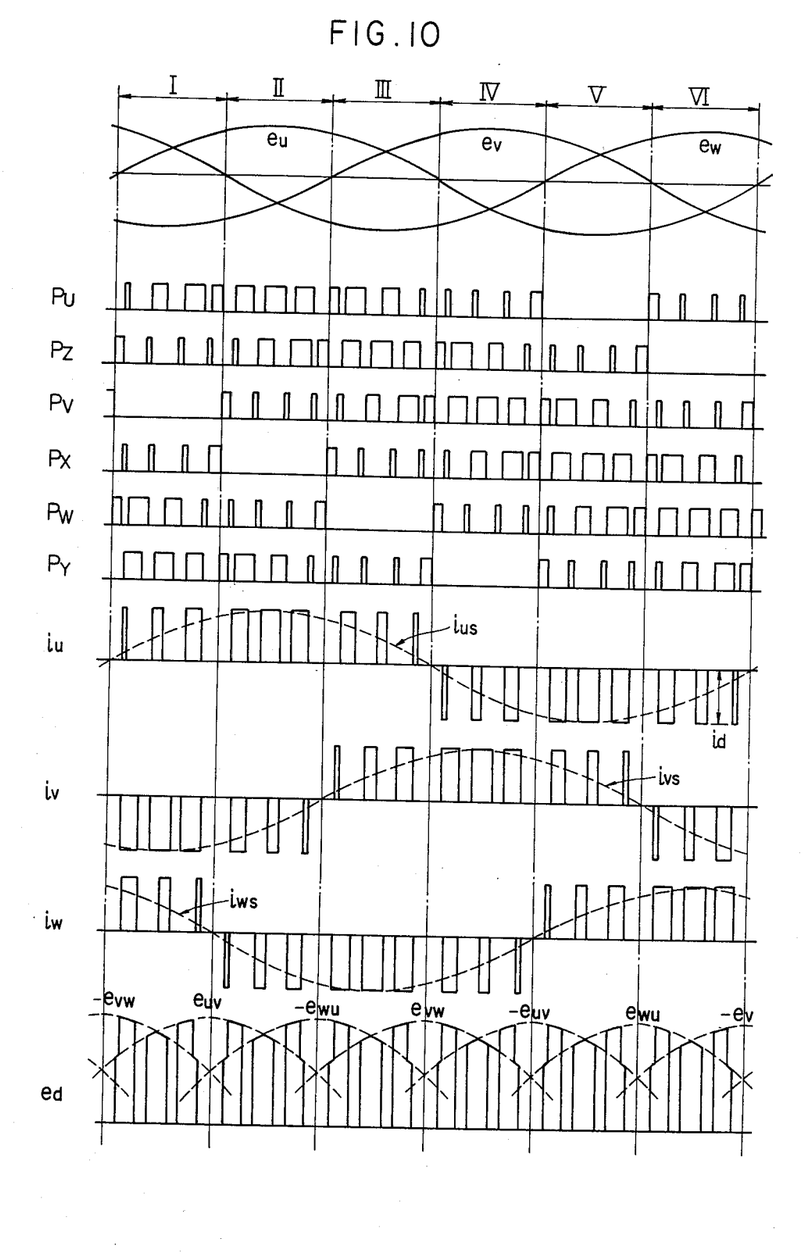

FIG. 10 shows the gate pulses $P_U$, $P_V$, $P_W$, $P_X$, $P_Y$, and $P_Z$, the PWM controlled currents $i_u$, $i_v$, and $i_w$, and the output voltage $e_d$ in one cycle of the source frequency.

In this case, the waveforms of the PWM controlled current $i_u$, $i_v$, and $i_w$ of the main circuit 3 are quite the same as those in the circuit of FIG. 6, while the waveforms of the gate pulse $P_U$, $P_V$, $P_W$, $P_X$, $P_Y$ and $P_Z$ are different from those in the circuit of FIG. 6. Therefore the input currents or the source currents $i_{us}$, $i_{vs}$ and $i_{ws}$ are the same as those of the circuit of FIG. 3.

In this embodiment, harmonic components in the AC source current can be considerably reduced in the same manner as the embodiment of FIG. 3.

Although description has been made as to the case where the function waveform generating circuit 55 generates a triangle wave, by way of example, in the previous embodiments, the same effect as such embodiments can be obtained by using various kinds of waveforms, such as a saw-tooth wave, a sinusoidal wave, or the like. The period of supply of the shoot-through pulse can be prolonged to a 180-degree period by combining the respective embodiments of FIGS. 3 and 7.

Figure 11:
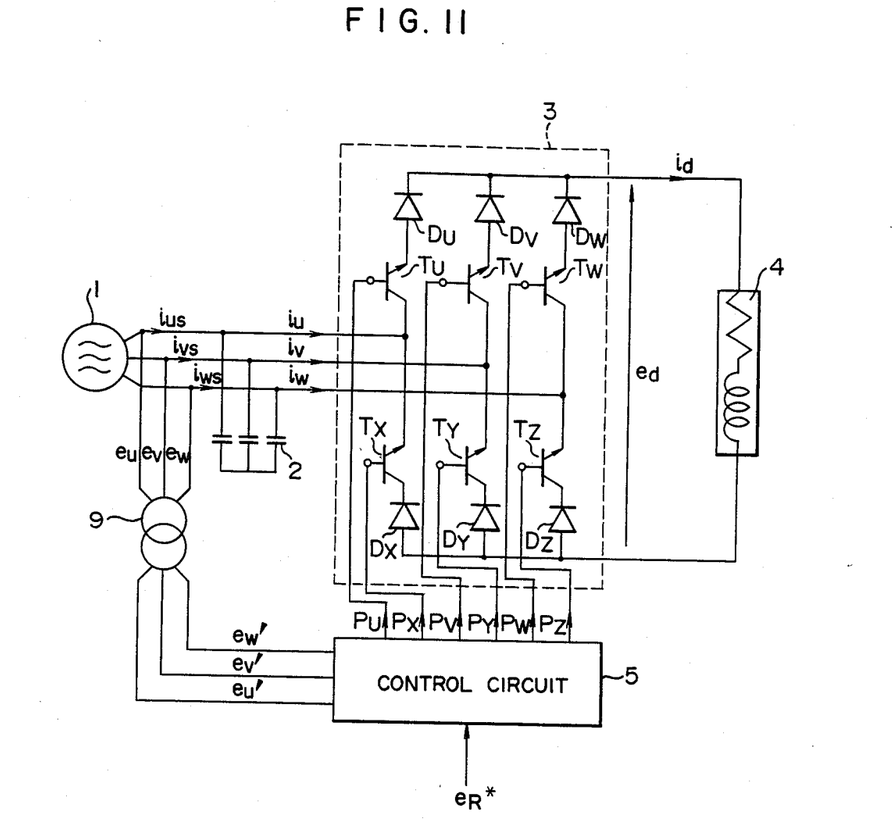
FIG. 11 is a schematic diagram showing the whole arrangement of the power converter apparatus wherein self-extinction devices in the form of power transistors are utilized.

Further, the present invention can be applied to a power converter apparatus in which power transistors are used as the self-extinction devices in place of the GTOs as shown in FIG. 11. That is, power transistors $T_u$, $T_v$, $T_w$, $T_x$, $T_y$ and $T_z$ are used as the self-extinction devices in place of the GTOs of FIG. 1 with diodes $D_u$, $D_v$, $D_w$, $D_x$, $D_y$ and $D_z$ being connected to the transistors to protect the transistors. Although description has been made, by way of example, as to the AC-DC converter as the power converter apparatus, it will be easily understood by those who skilled in the art that the present invention is not limited to such embodiments, but can be applied to a thyristor Ward-Leonard system in which a motor is provided as the load and to an inverter system in which a converter and an inverter are connected with each other. The remarkable technical effect according to the present invention will be summarized as follows:

(1) By performing pulse width modulation such that the pulse width of the PWM controlled current to the AC side of the power converter apparatus is varied sinusoidally, harmonic components of the AC source current can be extremely reduced while, for example, controlling the value of the DC output voltage of the converter.

(2) Accordingly, the bad influence of the harmonic components can be prevented from exerting upon the apparatus connected to the AC source, as well as the AC source side capacitor which acts as a filter can be considerably reduced in its capacity. Therefore, there is an advantage that the apparatus can be reduced in its size as well as cost.

(3) Further, in the sine wave PWM, the more the number of pulses is increased, the more the source current can be approached to an ideal sine wave and the more the harmonic component reduction effect can be increased. Such effects as described above could not be obtained in the conventional apparatus utilizing constant width pulses.

We claim:

1. In a power converter apparatus comprising a plurality of arms of self-extinction devices connected between a load and an AC source, and a capacitor connected between said AC source and said self-extinction devices, a control circuit for controlling said self-extinction devices by using a pulse width modulation signal, said control circuit comprising;

fundamental PWM pattern generating means for generating a predetermined fundamental PWM pattern signal having a pulse width which is sinusoidally varied in synchronism with a frequency of said AC source;

function waveform generating means for generating a predetermined function waveform signal synchronized with said fundamental PWM pattern signal;

shoot-through pulse generating means for generating a pulse having a predetermined pulse width and for shorting an output side of said power converter apparatus in a period of the pulse width; and signal composing means for composing the fundamental PWM pattern from said fundamental PWM pattern generating means, the function waveform signal from said function waveform generating means, and the shoot-through pulse from said shoot-through pulse generating means and for applying said composed signals to said self-extinction devices to thereby sinusoidally vary pulse widths of input current pulses to said power converter apparatus.

2. A control circuit according to claim 1, in which said shoot-through pulse generating means compares said function waveform with a desired output voltage reference signal to generate a pulse train having a pulse width corresponding to the value of said reference signal.

3. A control circuit according to claim 2, in which said fundamental PWM pattern generating means and said function waveform generating means include respective memory means in which said fundamental PWM pattern and said function waveform signal are stored respectively and from which said stored fundamental PWM pattern and function waveform signal are read out respectively in response to a clock pulse synchronized with the frequency of said AC source.

4. A control circuit according to claim 3, in which said function waveform is a triangular one and said voltage reference signal is an analog one, and in which said function waveform generating means further comprises a digital-to-analog converter for converting the read-out function waveform signal into an analog value.

5. A power converter apparatus for converting AC signals from an AC source into desired DC output current and for supplying a load with the converted DC current, said apparatus comprising:

a plurality of self-extinction devices for controlling conduction of AC currents of said AC source in response to predetermined gate pulses;

a capacitor connected between said AC source and said self-extinction devices; and a control circuit for producing said predetermined signals, said control circuit including fundamental PWM pattern generating means for generating a predetermined fundamental PWM pattern having a pulse width which is sinusoidally varied in synchronism with a frequency of said AC source, function waveform generating means for generating a predetermined function waveform signal synchronized with said fundamental PWM pattern, shoot-through pulse generating means for generating a pulse having a predetermined pulse width and for shorting an output side of said power converter apparatus in a period of the pulse width, and signal composing means for composing the fundamental PWM pattern from said fundamental PWM pattern generating means, the function waveform signal from said function waveform generating means, and the shoot-through pulse from said shoot-through pulse generating means and for applying said composed signals to said self-extinction devices to thereby sinusoidally vary pulse widths of input current pulses to said power converter apparatus.

6. A power converter apparatus according to claim 5, in which said self-extinction devices are gate turn-off thyristors.

7. A power converter apparatus according to claim 5, in which said self-extinction devices are power transistors.

* * * * *